US008552877B2

(12) United States Patent
Martin et al.

(10) Patent No.: US 8,552,877 B2
(45) Date of Patent: Oct. 8, 2013

(54) USER INTERFACE FOR RECHARGEABLE BATTERIES

(75) Inventors: Richard Martin, New Hyde Park, NY (US); William Bang, Baiting Hollow, NY (US); Mark Palmer, Bayshore, NY (US); Christopher Paul, Bayport, NY (US); Quintin Morris, Issaquah, WA (US)

(73) Assignee: Symbol Technologies, Inc., Holtsville, NY (US)

( * ) Notice: Subject to any disclaimer, the term of this patent is extended or adjusted under 35 U.S.C. 154(b) by 442 days.

(21) Appl. No.: 12/561,921

(22) Filed: Sep. 17, 2009

(65) Prior Publication Data

US 2011/0063119 A1  Mar. 17, 2011

(51) Int. Cl.
*G08B 21/00* (2006.01)

(52) U.S. Cl.
USPC .............. 340/636.19; 340/636.1; 340/636.15; 340/815.4; 340/815.58; 340/815.65; 320/107; 320/110; 320/112; 320/113

(58) Field of Classification Search
USPC ................. 340/636.19, 636.1, 636.15, 815.4, 340/815.58, 815.65; 320/107, 110, 112, 320/113
See application file for complete search history.

(56) References Cited

U.S. PATENT DOCUMENTS

| 5,216,371 | A  | * | 6/1993 | Nagai ......................... 324/428 |
| 5,248,929 | A  | * | 9/1993 | Burke .......................... 320/127 |
| 5,360,682 | A  | * | 11/1994 | Bohmer ......................... 429/91 |
| 5,654,640 | A  | * | 8/1997 | Bailey ......................... 324/435 |
| 6,483,275 | B1 | * | 11/2002 | Nebrigic et al. ............... 320/135 |
| 6,950,030 | B2 | * | 9/2005 | Kovarik et al. ............. 340/636.1 |
| 7,187,156 | B2 | * | 3/2007 | Nakasho et al. .............. 320/107 |
| 7,741,807 | B2 | * | 6/2010 | Satsuma ....................... 320/107 |
| 7,750,598 | B2 | * | 7/2010 | Hoffman et al. .............. 320/107 |
| 2002/0063550 | A1 | * | 5/2002 | Chen et al. .................. 320/110 |
| 2004/0164715 | A1 | * | 8/2004 | Nawa et al. .................. 320/149 |

* cited by examiner

*Primary Examiner* — Tai T Nguyen
(74) *Attorney, Agent, or Firm* — Randi L. Karpinia; Michael J. Giannetta

(57) ABSTRACT

A rechargeable battery includes a housing having an external surface including a user interface region. A battery cell within the housing is characterized by a charging status, a state of charge, and a state of health. A processor disposed within the housing determines and/or stores the charging status as well as one or more of the state of charge and the state of health of the battery cell. The user interface region provides a plurality of visual components configured to provide a plurality of visual cues relating to the charging status, the state of charge, and the state of health of the battery cell. The plurality of visual components may include a persistent display, an on-demand display, and an input component. The input component may be used to select the manner in which the visual cues are provided.

20 Claims, 4 Drawing Sheets

USER INTERFACE FOR RECHARGEABLE BATTERIES

TECHNICAL FIELD

The present invention generally relates to battery technology, and more particularly relates to user interfaces for rechargeable batteries used in conjunction with mobile devices in which the device communicates to the user the status of specific battery parameters.

BACKGROUND

Mobile devices (or "terminals"), such as hand-held computers, RF scanners, and the like, are used in a variety of contexts and may be employed for an extended length of time before their battery cells are recharged. Accordingly, at the start of a work shift, it is common for users of such devices to check a mobile device's battery level to ensure that the battery has enough charge to power the device for the full shift. In this regard, there are three primary aspects important for gaining a complete picture of battery level: (1) charging status; (2) the state of charge; and (3) the health of the battery.

Current methods of accessing these attributes of a battery are unsatisfactory in a number of respects. For example, acquiring the relevant battery information is often costly and time-consuming due to time requirements, misinterpretation, and/or lack of information. Furthermore, additional equipment is often required to access the battery state.

The task of determining a battery's health may be accomplished in a variety of ways. Smart battery ICs used in some battery designs are capable of collecting information regarding its state of charge and state of health; however, this information is typically accessible only through communication with a handheld terminal or a dedicated charger.

Furthermore, indicating the charging status of a battery is typically performed with an LED or series of LEDs on the charger or terminal. Depending on the physical location of the LEDs in relation to battery, the meaning of the observed visual cues may be easily misinterpreted.

One of the most common methods of accessing the state of health involves the use of ad hoc markings, such as an "entered service" date, that is written on the battery to estimate the number of charge cycles. Alternatively, additional equipment such as a terminal, or a system tied into terminals, may gather battery parameter information from the Smart IC.

The ad hoc marking method can be implemented on a deployment-by-deployment or a site-by-site basis, but it ultimately provides no guarantee of accuracy or consistency. The software on the terminal or tie-in to a back-end system is typically not available at the point where an end-user can make use of it. Thus, none of the prior art methods provide users with quick and unambiguous information about the state of a battery at the point when those users need the information to make decisions regarding which batteries to use.

Accordingly, there is a need for improved methods of presenting to a user the state of health and charge of a battery within a mobile device, and as a stand alone battery. Other desirable features and characteristics of the present invention will become apparent from the subsequent detailed description and the appended claims, taken in conjunction with the accompanying drawings and the foregoing technical field and background.

BRIEF SUMMARY

In accordance with one embodiment of the present invention, A rechargeable battery includes a housing having an external surface; a battery cell within the housing, the battery cell having a state of charge, and a state of health; a processor disposed within the housing, the processor configured to store and display the state of charge and the state of health of the battery cell; and a user interface region provided on the external surface of the housing, the user interface region including a plurality of visual components configured to provide a plurality of visual cues relating to the charging status, the state of charge, and the state of health of the battery cell. In a particular embodiment, the plurality of visual components includes a persistent display, an on-demand display, and an input component. The input component may be used to select the manner in which the visual cues are provided. In various embodiments, a charger, mobile device, or other accessory determines the charging status and communicates this information to the battery for display.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following discussion generally relates to improved methods and apparatus for a battery user interface (UI) applicable to mobile devices. In that regard, the following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to batteries, common LEDs, LCDs, and other display elements, and the like need not and will not be described herein.

Figure 1:
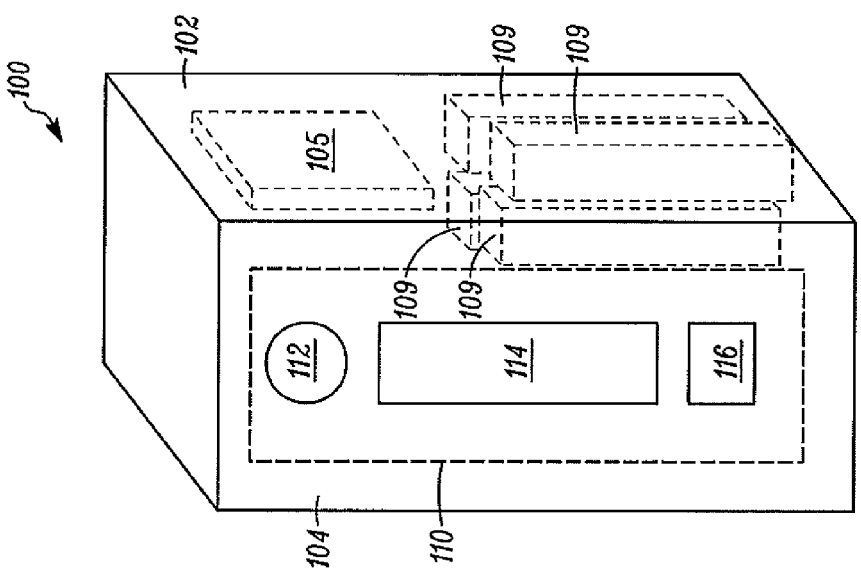
FIG. 1 is a conceptual isometric overview of an exemplary battery in accordance with the present invention.

Referring to FIG. 1, a rechargeable battery 100 in accordance with an exemplary embodiment generally includes a housing 102 having an external surface (e.g., a planar or curvilinear surface) 104. A suitable battery cell 109 is provided within the housing, e.g., a Li ion cell or the like. A processor 105 (e.g., one or more integrated circuits, etc.) is also disposed within the housing. Battery cell 109 is characterized by a number of attributes and states, including for example state of charge and state of health, which are determined as described in further detail below.

More particularly, "charging status" as used herein refers, generally, to whether the battery is fully charged, is in the process of charging, and/or whether a charging error has occurred. The term "state of charge" refers to the ratio of the total charge in the battery to a capacity metric—i.e., either (a) the nominal capacity for which the battery is specified, (b) the minimum capacity for which the battery is specified, or (c) the maximum capacity that the battery could hold if it were fully charged. The term "state of health" refers to either (a) whether the total charge current supplied to the battery over its existence divided by any one of the three state of charge denominators cited above exceeds a given threshold; or (b) whether the tested capacity of the battery divided by any of the three state of charge ratios cited above falls below a predetermined threshold. Under conventional testing conditions, these measurements are performed at 25° C. and at currents equal to the nominal capacity of the battery pack divided by 5.0 hours; however, other testing conditions may be employed.

A user interface region 110 is provided on external surface 104 of housing 102. The user interface region no includes a plurality of components (112, 114, 116, etc.) configured to provide a plurality of visual cues relating to the charging status, the state of charge, and the state of health of the battery cell, and to allow user interaction with the interface.

Figure 2:
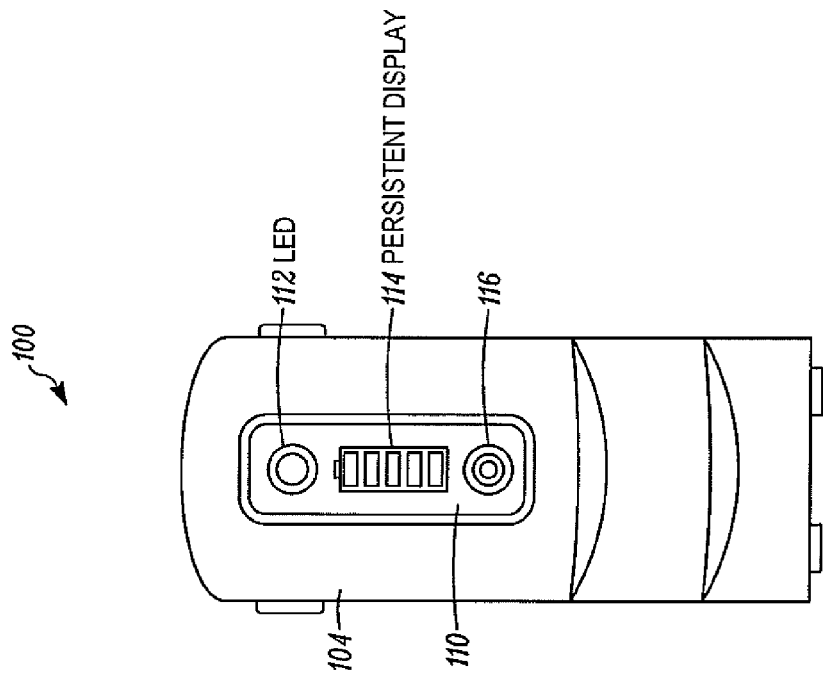
FIG. 2 depicts a battery in accordance with a particular embodiment.

In the illustrated embodiment, as shown in FIGS. 1 and 2, the plurality of visual components includes a persistent display 114, an on-demand display 112, and an input component 116. The present invention is not so limited, however, and may include any number of such components.

Persistent display 114 includes any display element that is refreshed but does not require additional energy to maintain the state of its image. Such a display might include, for example, a digital ink display as is known in the art. In the illustrated embodiment, persistent display 114 includes an element whose length (either continuous length or segmented length) is proportional to some attribute of battery cell 109 (e.g., its state of charge). The present invention comprehends a variety of such shapes and configurations, including circles, rings, polygons, or any other combination of such shapes.

On-demand display 112 includes any display element that is active in that it requires energy to maintain its state, and thus is typically selectively activated. In one embodiment, for example, on-demand display 112 corresponds to a multi-color LED whose color may be used to provide visual cues relating to an attribute of the battery, such as state of health and/or charge status. On-demand display 112 may be activated, in some contexts, via selection of input component 116.

Input component 116 includes any type of switch, button, dial, sensor, or any other device configured to allow input from a user. In one embodiment, input component 116 comprises a momentary-contact button as is known in the art.

In accordance with one aspect of the present invention, the visual cues provided by the user interface no are dependent upon the location of battery 100. That is, under normal conditions, the battery is typically located in one of three locations and has one of three major states—i.e.: inserted within a charger (to facilitate charging when the mobile device is not being operated), inserted within a mobile device (to facilitate charging or supply power for mobile computer operation), or stand-alone (inserted within neither the charger nor the mobile device and is neither charging nor discharging). In this regard, as used herein, the term "charger" refers to any apparatus that actually charges the battery (i.e., includes a charging circuit), rather than simply a device that provides power to a such a charging circuit.

In the illustrated embodiment, when the location corresponds to within a charger, the visual cues of the on-demand active display 112 may be configured such that they correspond to the charge status and the state of health of battery 100 while the battery is in the charger. At the same time, the visual cues of the persistent display 114 correspond to the state of charge and state of health. As the charger can supply power to the battery to power its display, the on-demand display 112 may optionally remain on while the battery is in the charger, regardless of the state of the button.

Figure 3:
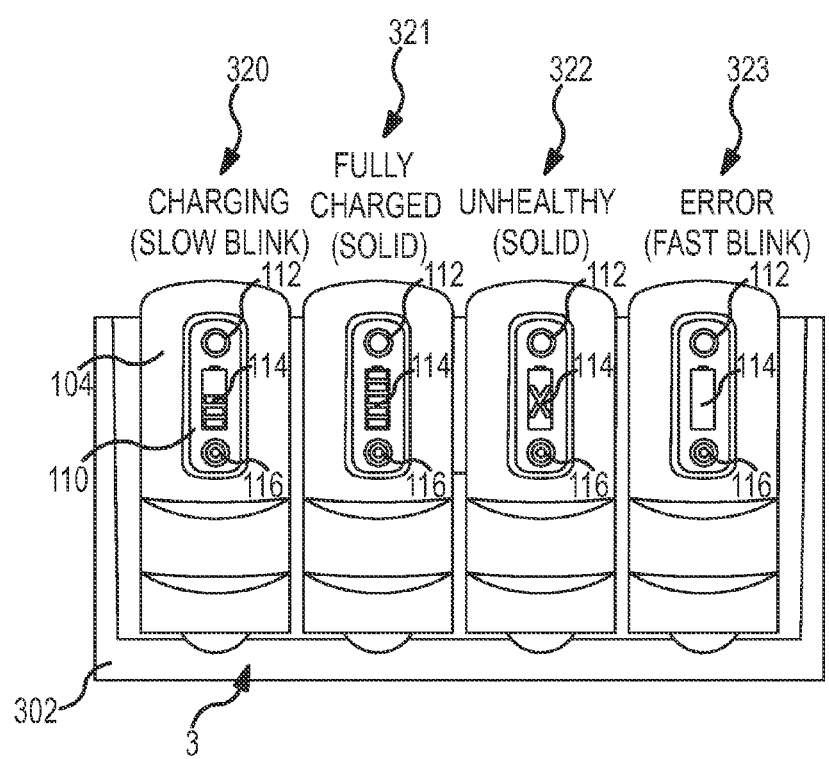
FIG. 3 depicts multiple batteries as shown in FIG. 2 inserted within a charger and having a variety of states.

Such an embodiment is shown in FIG. 3, in which a set of four batteries 320-323 with various statuses are inserted within a charger 302 such that their respective user interfaces 110 are exposed for easy viewing. As shown, on-demand display 112 changes depending upon charge status and health. In a particular embodiment, on-demand display 112 exhibits a yellow, slow-blinking ring when charging and healthy (320), a green, solid ring when fully charged and healthy (321), a red, slow-blinking ring when charging and unhealthy a solid, red ring when fully charged and unhealthy (322), and a yellow, fast-blinking ring when a charging error has occurred (323). It will be appreciated that the choice of colors and blink-rates may vary, and that the invention is not so limited.

Also as indicated in FIG. 3, persistent display 114 indicates the state of charge with a segmented linear display (in this case, surrounded by a fixed battery outline) corresponding to the percentage of maximum charge level (320, 321). Furthermore, persistent display 114 displays an icon (in this case an "X") in the event that the battery is deemed unhealthy (322). In this unhealthy state, when a user activates input component 116, however, persistent display 114 temporarily displays the appropriate number of segments, depending upon the state of charge (example 521).

Further in accordance with the illustrated embodiment, when the battery is inserted within a mobile device, the visual cues of the on-demand display 112 may correspond to the charge status and the state of health. Alternatively, the on-demand display 112 may be rendered inactive while the battery is in the mobile device. At the same time, the visual cues of the persistent display 114 correspond to the state of charge and state of health. It is therefore preferred that surface 104 is exposed to the user even when seated within the mobile device.

Figure 5:
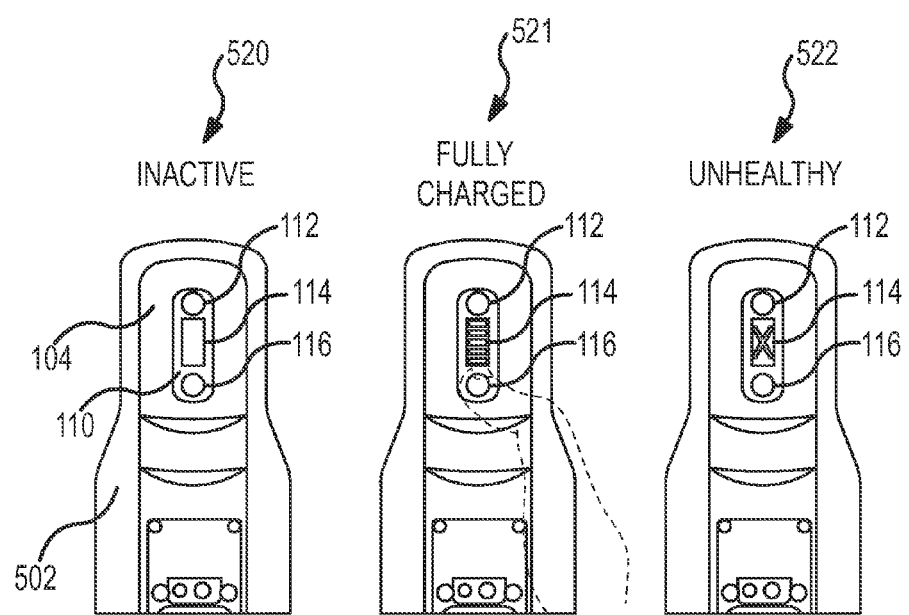
FIG. 5 depicts multiple batteries as shown in FIG. 2 having a variety of states while inserted into a mobile device.

Referring to FIG. 5, for example, when the battery is inserted within a mobile device 502, and the battery is inactive, persistent display 114 and on-demand display 112 are both blank, or not activated (example 520) when the battery is healthy. When the battery is deemed unhealthy (example 522), persistent display 114 displays an icon, such as an "X" to indicate this state of health. In either case (healthy or unhealthy) when a user activates input component 116, however, persistent display 114 temporarily displays the appropriate number of segments, depending upon the state of charge (example 521).

Figure 4:
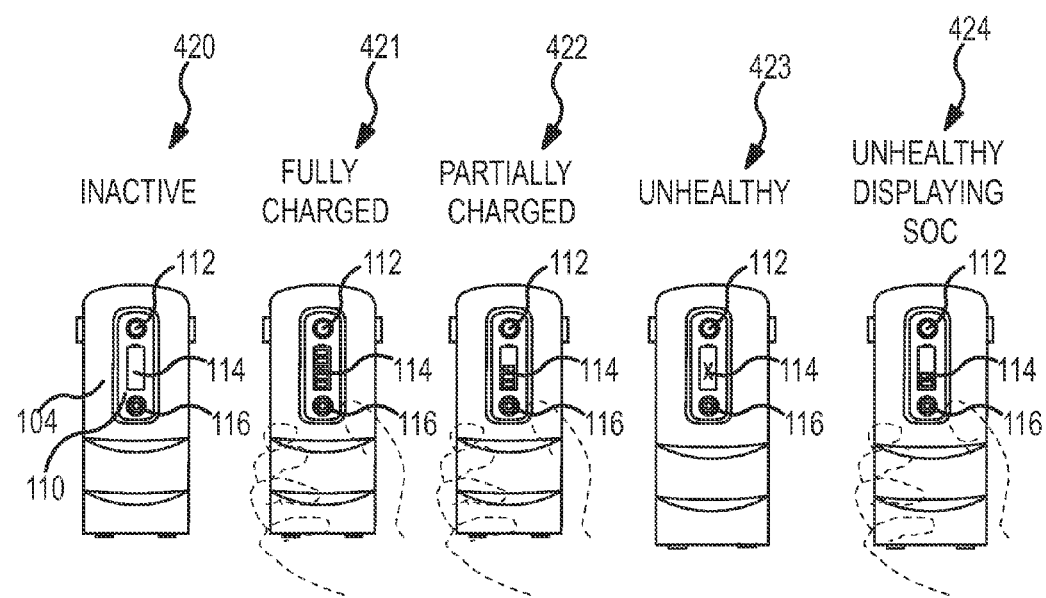
FIG. 4 depicts multiple batteries as shown in FIG. 2 having a variety of states when not inserted into a charger or the mobile device.

Finally, when the battery 100 is in the stand-alone mode, the visual cues of the on-demand display correspond to the state of health, and the visual cues of the persistent display correspond to the state of charge and state of health. Referring to FIG. 4, for example, various examples (420-424) depict the illustrated battery under different conditions. In example 420, the battery is inactive and healthy, and both on-demand display 112 and persistent display 114 are blank. When input component 116 is activated on a healthy battery (e.g., by a user hand 402), and the battery is fully charged or partially charged, on-demand display 112 shows a green ring, and persistent display shows the corresponding number of segments (examples 421 and 422). In the event that the battery is unhealthy, the persistent display 114 shows an icon (e.g., an "X"). When input component 116 is activated, on-demand display 112 shows a red ring and persistent display 114 displays a particular number of segments.

It will be appreciated that a user interface as described is advantageous in that the state of the battery is presented wholly by the battery itself, and does not require a user interface on the charging equipment. Furthermore, locating the user interface on the battery prevents any confusion about, for example, which information belongs to which battery. When the battery is inserted within the mobile device, the user interface provides an alternate way of accessing the battery information without using the mobile device, which may or may not have access to the battery state. In this way, the user can quickly and unambiguously determine the charging status, state of charge, and state of health of batteries regardless of whether those batteries are located in chargers, in terminals, or are stand-alone, and without incurring the cost of additional equipment.

Note also that the system described above does not merely report charge cycles, but is preferably configured to determine the "health" of the battery based on a centrally determined threshold and the cycle count of each battery.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A rechargeable battery comprising:
a battery housing having an external surface;
a battery cell within the battery housing, the battery cell having a state of charge, a charging status, and a state of health;
a processor disposed within the battery housing, the processor configured to interface with a charger system and to thereby communicate and determine at least one of the charging status and the state of health of the battery cell;
a user interface region provided on the external surface of the battery housing, the user interface region including a plurality of visual components configured to provide a plurality of visual cues relating to at least one of the charging status and the state of health of the battery cell; and
a switch coupled to the plurality of visual components, activation of the switch causing the plurality of visual cues to be provided on the plurality of visual components.

2. The rechargeable battery of claim 1, wherein the user interface region includes a persistent display and an on-demand display.

3. The rechargeable battery of claim 2, wherein the persistent display comprises a digital paper display.

4. The rechargeable battery of claim 2, wherein the on-demand display comprises a light-emitting diode.

5. The rechargeable battery of claim 1, wherein the switch comprises a momentary-contact button.

6. The rechargeable battery of claim 1, wherein the plurality of visual cues are dependent upon a location of the battery, wherein the location comprises one of inserted within a charger, inserted within a mobile device, and inserted within neither the charger nor the mobile device.

7. The rechargeable battery of claim 6, wherein the plurality of visual components includes a persistent display and an on-demand display.

8. The rechargeable battery of claim 7, wherein, when the location corresponds to within a charger:
the visual cues of the on-demand display correspond to the charging status and the state of health; and
the visual cues of the persistent display correspond to the state of health.

9. The rechargeable battery of claim 7, wherein, when the location corresponds to within a mobile device:
the visual cues of the on-demand display correspond to the charging status and the state of health; and the visual cues of the persistent display correspond to the state of health.

10. The rechargeable battery of claim 7, wherein, when the location corresponds to neither within a charger nor within a mobile device:
the visual cues of the on-demand display correspond to the state of health; and
the visual cues of the persistent display correspond to the state of health.

11. The rechargeable battery of claim 7, wherein the persistent display provides the visual cues in the form of a segmented linear display associated with a state of charge, and an icon indicating the state of health.

12. The rechargeable battery of claim 7, wherein the on-demand display provides the visual cues in the form a range of light colors.

13. The rechargeable battery of claim 1, wherein the switch, when activated, changes which of the plurality of visual cues are provided.

14. A method for indicating a state of a rechargeable battery, comprising:
determining at least one of a charging status and a state of health of the battery with a processor disposed within a housing of the battery;
displaying on a plurality of visual components positioned on a surface of the housing of the battery, a plurality of visual cues indicating at least one of the charging status and the state of health of the battery; and
providing an actuatable switch on the surface of the housing of the battery, an activation of the switch causing the plurality of visual cues to be displayed on the plurality of visual components.

15. The method of claim 14, wherein the switch is configured to selectably change the manner in which the plurality of visual cues are indicated.

16. The method of claim 14, wherein indicating the charging status includes displaying a portion of the visual cues via a persistent display.

17. The method of claim 14, further including indicating a state of charge using an on-demand display having a range of color values.

18. A rechargeable battery configured to be removeably inserted within a mobile device, comprising:
a battery housing having an external surface including a user interface region that is exposed when the battery housing is inserted into the mobile device, the user interface region comprising a plurality of visual components;
a battery cell within the battery housing, the battery cell having a charging status, a state of charge, and a state of health;
a processor disposed within the battery housing and configured to communicatively couple to an external device, wherein at least one of the processor and the external device are configured to determine the state of health of the battery cell; and
a switch coupled to the plurality of visual components, activation of the switch causing a plurality of visual cues relating to at least one of the charging status and the state of health of the battery cell to be provided on the plurality of visual components;

wherein the state of health corresponds to whether a tested capacity of the battery divided by a capacity metric of the battery is below a predetermined threshold.

19. The rechargeable battery of claim 18, wherein the capacity metric comprises one of nominal capacity, minimum capacity, and tested capacity.

20. The rechargeable battery of claim 18, wherein the plurality of visual components comprises an on-demand display that indicates a charging status of the battery via a range of light color values, and a persistent display that indicates a state of charge of the battery via a segmented display.

* * * * *